Aug. 25, 1964    A. B. WOOD    3,145,848
REFRESHMENT-TRAY-FORMING TEMPLET
Filed May 3, 1963    2 Sheets-Sheet 2

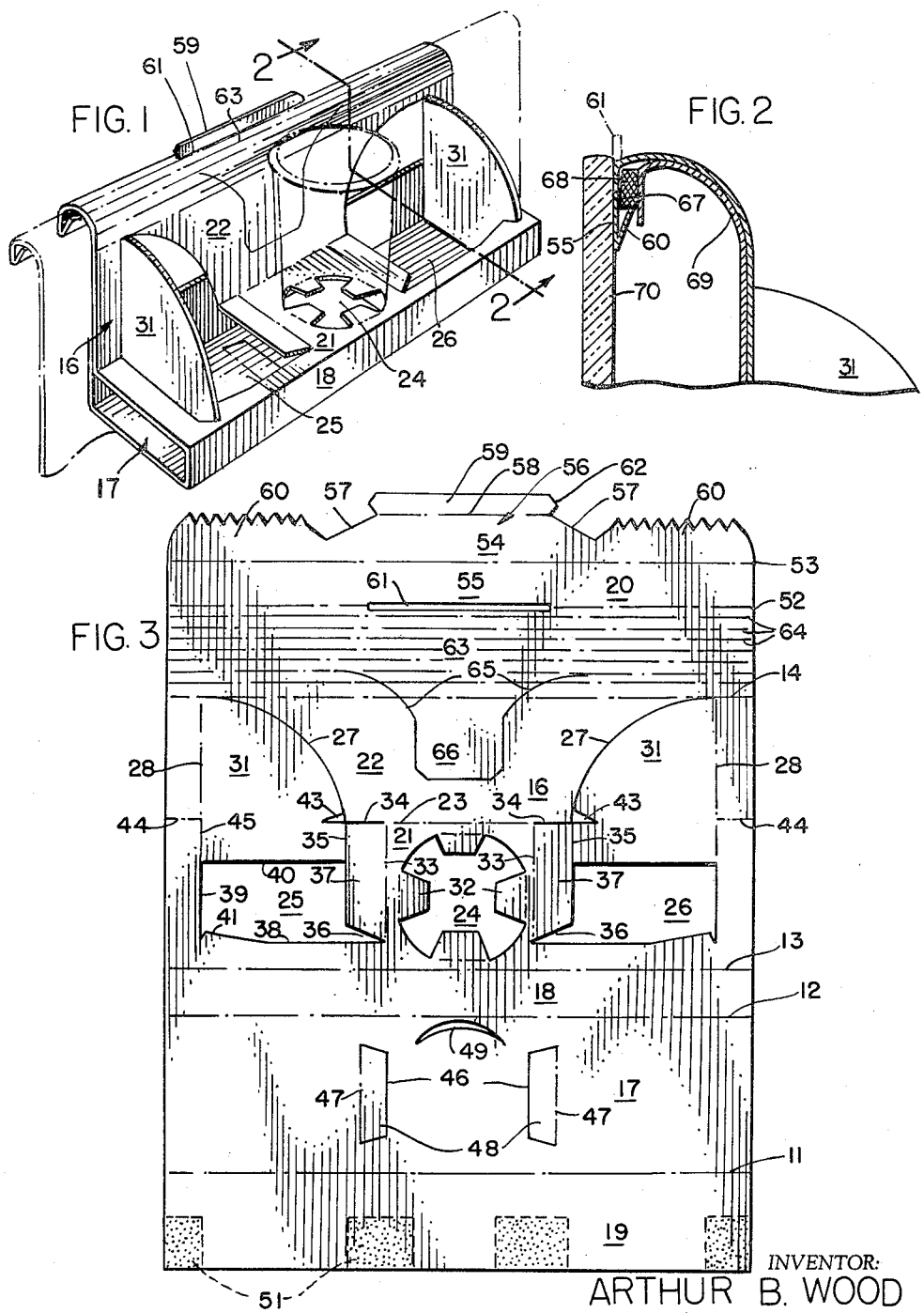

INVENTOR:
ARTHUR B. WOOD
BY
ATT'YS

United States Patent Office 3,145,848
Patented Aug. 25, 1964

3,145,848
REFRESHMENT-TRAY-FORMING TEMPLET
Arthur B. Wood, Arlington Heights, Ill., assignor to Admart, Inc., Chicago, Ill., a corporation of Illinois
Filed May 3, 1963, Ser. No. 277,901
18 Claims. (Cl. 211—88)

This invention relates to a piece of flexible material cutout, scored and slitted to form a templet for conversion into a tray for suspension on the door of a motor vehicle to support refreshments for consumption by occupants of the vehicle.

One of the problems experienced by persons desiring to consume refreshments while sitting in a motor vehicle is the lack of a facility for the temporary support of the refreshments during the period required for their consumption. The problem is acute when the refreshments involve a beverage and one or more other items. The problem is especially present for persons patronizing a drive-in stand where the patrons have to transport the refreshments from the point of dispension to the vehicle. Even if some means be provided for transport of the refreshments to the vehicle it affords no level places, other than the floor whereon to rest the beverage container and/or the other items of food.

The main objects of this invention are; to provide an improved form of templet-type piece of flexible material cut-out, scored and slitted to permit the facile conversion thereof into a tray having pockets for the support of several refreshment items; to provide an improved tray-forming templet-type piece of material of this kind having one pocket for the seating of a beverage cup and other pockets for the positioning of other food items; to provide a tray-forming templet-type of material of this kind adapted for convenient suspension on any one of the doors of the motor vehicle; to provide an improved tray-forming templet of this kind of such simple character as to make its manufacture and marketing very inexpensive and its disposition after one-time use economically reasonable; and to provide an improved tray-forming templet of this kind which, after one-time use, may be folded readily into flat compact form incident to a later repeated use.

In the adaptation shown in the accompanying drawings:

FIGURE 1 is a perspective view of a refreshment tray converted from a templet-type piece of flexible material constructed in accordance with this invention, the tray being shown supported in use position on the door of a motor vehicle;

FIG. 2 is an enlarged, fragmentary, cross-sectional view taken on the plane of the line 2—2 of FIG. 1;

FIG. 3 is a plan view of a templet-type piece of material constructed in accordance with this invention;

Figure 4:
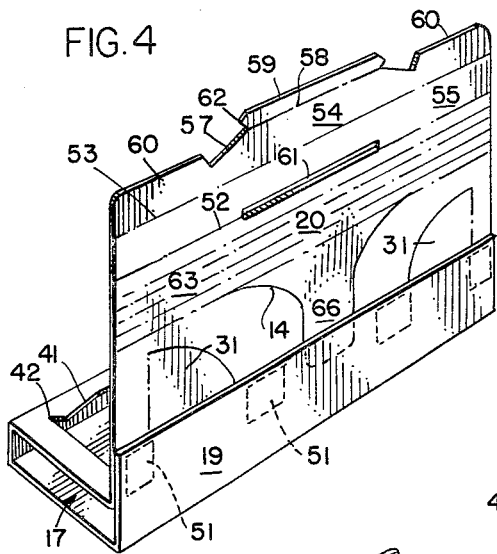
FIG. 4 is a rear view of the formed tray before its positioning on the door of a vehicle.

The essential concept of this invention involves an oblong-shaped, piece of flexible material divided by various scores and slits into a plurality of sections with hinged wings and flaps for conversion by folding the sections along the scores and swinging the hinged wings and flaps into positions transverse to the folded sections, to constitute a tray, having a plurality of upwardly-open pockets for the reception of various refreshment items, and suspendable on the door of a motor vehicle for convenient consumption of the refreshments by an occupant of the vehicle.

A templet-type piece of material embodying the foregoing concept preferably is die cut from suitable paper stock and divided by four main, transverse, parallel scores 11, 12, 13 and 14, into a pocket-forming section 16, a base section 17 with an intermediate spacing section 18 and a respective bordering back section 19 and a suspension section 20.

The pocket-forming section 16 is divided into two portions 21 and 22 by a substantially medial score 23. The one portion 21 has three cut-outs 24, 25 and 26 and the other portion 23 has curved slits 27 and scores 28 defining wings 31.

The cut-out 24 formed in the medial part of the portion 21, of the pocket-forming section 16, approximates a circular contour and, in the converted tray, becomes a pocket for the seating of a cup of beverage, as will be explained presently. Diametrically-arranged pairs of tabs 32, scored along their bases, permit their inward disposition to yieldingly grip a beverage cup. Short, parallel scores 33, disposed transverse to the medial score 23 but short of the score 13, along with slits 34 and 35 and notches 36 define flaps 37 on opposite sides of the cut-out 24 which, when bent inwardly, in the converted tray, contact the base section 17 and stabilize the support of a cup.

The cut-outs 25 and 26 are substantially rectangular in contour, being defined by the perimeters 38, 39 and 40 and the outer free edges of the respective flaps 37. Each perimeter 38 in its approach to the perimeter 39 is formed with an inwardly extending inclined ledge 41 terminating in a notch 42. The function of this ledge 41 and notch 42 will be explained presently.

For the wings 31, the slits 27 preferably are approximately quadrant shaped with the part at the opposite side of the medial score 23 parallel with the wing-defining score 28. At a point directly opposed to the medial score 23, each wing is formed with a notch 43. The score 28, whereby each wing 31 is in effect hinged, extends between the score 14 to short of the score 44 aligned with the medial score 23. Each score 28 is located adjacently inward and parallel to the respective lateral perimeter of the piece of material.

The base section 17 has a pair of opposed, transverse, elongated U-shaped slits 46 and base scores 47 forming a pair of flaps 48 which, in the converted tray, are depressed inwardly into transverse disposition to the base section 17. Between the flaps 48 and adjacent the score 12 is a crescent-shaped slot 49. The function of the flaps 48 and the slot 49 will be explained presently.

The spacing section 18, between the scores 12 and 13, determines the spacing of the cup-forming section 16 from the base section 17 when the templet is converted into a tray.

The back section 19, a bit wider than the spacing section 18, has suitable spots 51 of adhesive along the perimetrical face thereof on the under side. Such adhesive spots may be of the pressure-sensitive type or that which requires moistening.

The suspension section 20 has a pair of spaced scores 52 and 53 located inwardly parallel to the free perimeter thereof and defining a pair of strips 54 and 55. The folding over of these strips forms an extension for insertion into the vertically-open space in a vehicle door to suspend the converted tray in use position, as presently will be explained.

The irregular contour of the free perimeter of the strip 54 is an important factor in effecting the folded-over disposition of these strips 54 and 55 to ensure retention on the suspension section 20 on the vehicle door. To that end a medial portion 56 of the strip 54 extends outwardly beyond the spaced recesses 57 and is scored at 58 to provide a narrow tongue 59 extending outwardly beyond the parallel perimeters of the opposed bordering lips 60. The tongue 59 in length, parallel to the scores 52 and 53, approximates the comparable length of a medial slot 61 formed in the suspension section 20 preferably along the score 52. Also, preferably, the opposite ends of the tongue 59 are pointed as shown at 62 so that after the tongue is inserted into the slot 61 these points tend to ensure retention of the tongue 59 in the slot 61.

The portion 63, of the suspension section 20 between the scores 14 and 52, has a series of closely-spaced scores 64 which permit the portion 63 to be flexed to assume a curvature conforming to the sill of a motor-vehicle door when the templet is converted into tray use. The portion 63 and the adjacent portion 22 of the cup-forming section 16 have a pair of converging arcuate slits 65 defining a tongue 66 which is insertable into the slot 49 for holding the converted tray collapsed, as presently will be explained.

Figure 5:
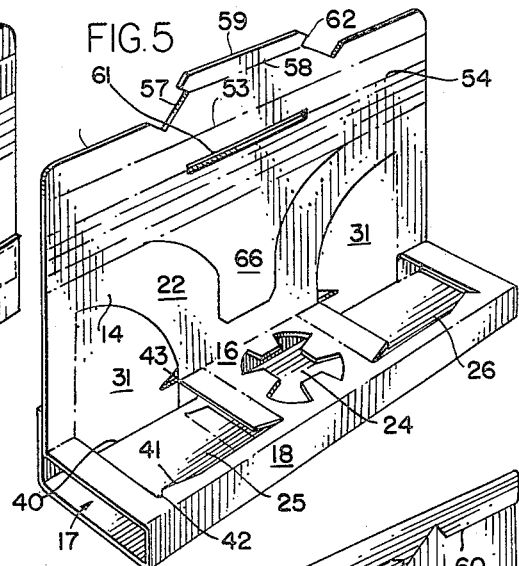
FIG. 5 is a front view of the same.

The conversion of the above-described templet-type piece of material into tray use is as follows:

The piece of material first is creased along the scores 11, 12, 13 and 14 to facilitate easy folding to dispose the portion 21 of the pocket-forming section 16 in parallel relationship to the base section 17, as determined by the spacing section 18 and the fixing of the adhesive-bearing perimeter of the back section 19 in overlapping position on the back of a comparable perimetrical part of the portion 22 of the pocket-forming section 16. (See FIGS. 4 and 5.)

Figure 6:
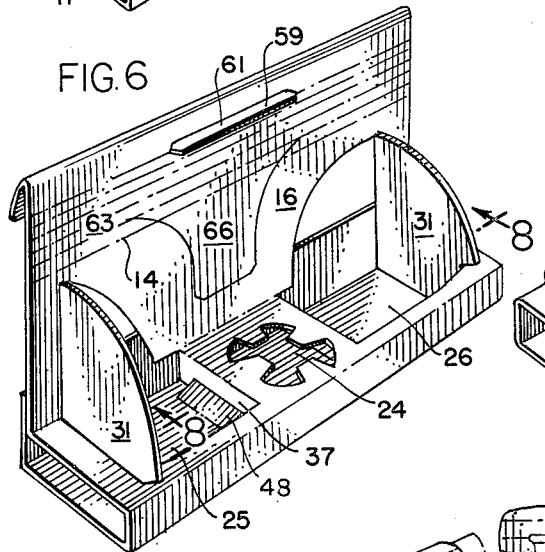
FIG. 6 is a view similar to FIG. 5 but showing the sustaining wings and flaps shifted into tray-forming position and the scored end of the suspension section folded back upon itself preparatory to positioning the tray on the door of a vehicle, as shown in FIG. 1.
Figure 7:
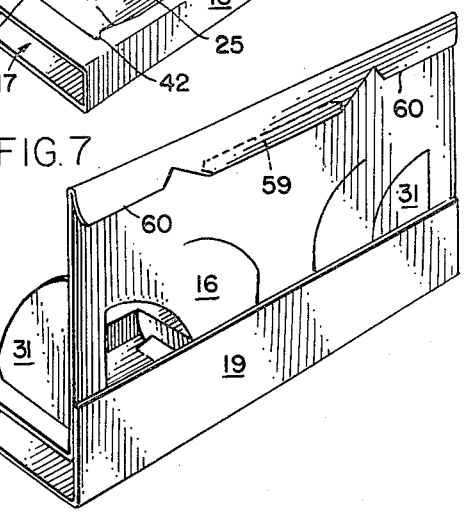
FIG. 7 is a rear view of the tray as shown in FIG. 6.

Next, in succession, the wings 31 are swung outwardly into positions transverse to both portions 21 and 22 of the pocket-forming section 16. (See FIGS. 6 and 7.) In such swinging of the wings 31 the notches 43 ride over the ledges 41, as the wings become slightly flexed, and the wings are thus retained in these transverse positions by the respective notches 42. The wings 31 thus are yieldingly fixed in such transverse positions, with the base perimeter 40 thereof in contact with the inner face of the base section 17 and, thereby, forming the spaced disposition of the end parts of the converted tray.

Figure 8:
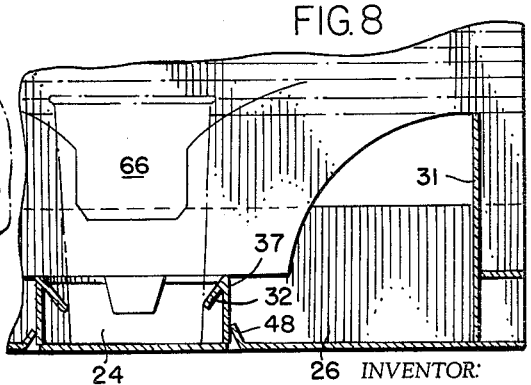
FIG. 8 is a fragmentary view of the tray shown in FIG. 6 taken on the plane of the line 8—8 of that figure.

Thereupon, the flaps 37 are bent inwardly downward, transverse to the portion 21 of the pocket-forming section 16, into contact with the base section 17 to form the spaced disposition of the medial portion of the converted tray. To ensure these flaps 37 being retained in this stabilizing position the flaps 48 are depressed upwardly of the base section 17 to engage the flaps 37. (See FIGS. 6, 7 and 8.)

The thus converted tray, with its three pockets formed by the cut-outs 24, 25 and 26, is ready for placing refreshment items thereon. The central cut-out is intended to seat a beverage cup, as shown in phantom in FIGS. 1 and 8. The seating of the cup in this central pocket depresses the tabs 32 which so engage the sides of the cup as to secure it against accidental dislodgment.

The two side pockets formed by the cut-outs 25 and 26 will accommodate other refreshment items such as, for example a hamburger on a bun and a quantity of french-fried potatoes.

Such a templet-type piece of material may be provided by drive-in refreshment stands or it may be obtained through other sources by those traveling in motor vehicles and contemplating consuming refreshments during the enroute occupancy of the vehicle.

The converted tray, being intended for suspension on the door of the vehicle, obviously, should be positioned before the refreshments are placed in the tray pockets or after temporarily removing the refreshments from the tray in the event the tray is used to convey the refreshments from a drive-in stand to the vehicle.

To ready the tray for suspension on a vehicle door, the strips 54 and 55, of the suspension section 20, are doubled over one on the other and the tongue 59 inserted into the slot 61. (See FIGS. 6 and 7.) Thereupon these doubled-over strips 54 and 55 are folded back along the score 52 into a position substantially parallel with the upwardly-extending portion 22 of the pocket-forming section 16. The positioning of the folded-over strips 54 and 55 will form an extension which can be inserted into the space 67 (FIG. 2) between an interior strip 68 on the door sill 69 and the glass panel 70. Such an extension is pressed down into this space 67 to locate the score 52 along the top outer edge of the strip 68. This will result in the medial portion 56 of the strip 54 being pressed firmly against the opposed face of the strip 55 and thereby cause the lips 60 to be angled inwardly away from the opposed face of the strip 55 so as to engage the under edge of the strip 68 (FIG. 2). The closely-scored intermediate portion 63 of the suspension section 20 will conform to the contour of the door sill 69 and, thereby, suspend the tray in use position. The refreshment items then may be placed in the respective pockets for the convenient and leisurely consumption by the occupant, or occupants, of the vehicle.

Figure 9:
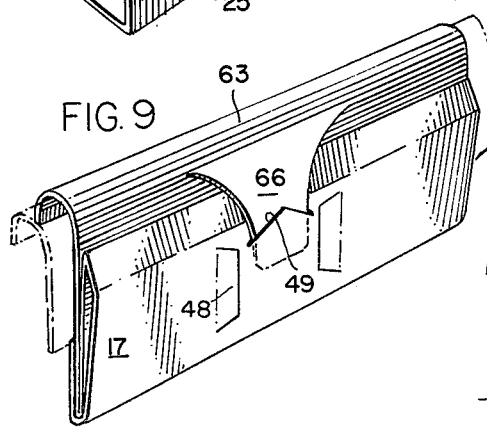
FIG. 9 is a perspective view of the tray collapsed after use to be left hanging on the door for a later re-use.

If a shortly-later use of the tray should be contemplated, the tray may be collapsed and left suspended on the vehicle door. This is effected by folding back the flaps 37, after depressing the flaps 47, and swinging the wings 31 back into the plane of the other portion 22 of the pocket forming section 16. Thereupon, the portion 21 of the pocket-forming section 16 and the parallel base section may be folded inwardly upwardly against the portion 22 of the pocket-forming section 16. Upon pressing out the tongue 66 it may be inserted through the crescent slot 49 so as to retain the tray in such collapsed condition as shown in FIG. 9.

Although but one specific embodiment of this invention is herein shown and described it will be understood that details of the construction shown may be altered or omitted without departing from the spirit of the invention as defined by the following claims.

I claim:

1. A tray-forming templet comprising, a piece of flexible material having a series of spaced, transverse, parallel scores dividing the material into a two-portion pocket-forming section, a base section, an intermediate spacing section and two bordering sections, one portion of the pocket-forming section having three aligned cut-outs with interposed scored flaps, the other portion of the pocket-forming section being slitted and scored to define a pair of wings, the piece of material being foldable along the parallel scores to dispose the cut-out portion in spaced parallel disposition to the base section with the perimeter of the one bordering section fixed to the perimeter of the other portion of the pocket-forming section, the sections being secured in such disposition by the swinging of the wings into positions transverse to both portions of the pocket-forming sections and depressing the flaps into positions transverse to the base section to thereby form a tray wherein the cut-outs become pockets for the reception of articles.

2. A tray-forming templet as set forth in claim 1 wherein the other bordering section has supplemental scores formed therein to define a fold-over strip for insertion into the space between a vehicle door sill and glass panel to suspend the tray in use position.

3. A tray-forming templet comprising, a piece of flexible material having a plurality of spaced, parallel, main scores dividing the material into a base section and a pocket-forming section separated by an intermediate section and respectively bordered by a back section and a suspension section, the pocket-forming section being divided into two portions by a substantially medial score parallel with the main scores, one portion of the pocket-forming section having three cut-outs, the other portion of the pocket-forming section being slitted and scored to define a pair of wings respectively opposed to the two side cut-outs, the piece of material being foldable along the main and median scores to dispose the one portion of the pocket-forming section in spaced parallel disposition above the base section and the other portion of the pocket-forming section normal to the base section with a part of the back section overlapping and fixed to a part of the other portion of the pocket-forming section, whereby the swinging of the wings on their respective scores into positions transverse to both portions of the pocket-forming section will secure the aforesaid disposition of the sections as a tray with three pockets for the reception of selected articles.

4. A tray-forming templet as set forth in claim 3 wherein the back section has an adhesive applied to the one face thereof for fixing the back section to the other portion of the pocket-forming section and ensure retention of the folded material in its tray-forming disposition.

5. A tray-forming templet as set forth in claim 3 wherein the suspension section has a pair of spaced, supplemental scores disposed inwardly parallel with the free perimeter of the suspension section to form a pair of strips for fold-over as an extension for interposition into the space between a vehicle-door sill and glass panel to locate the tray in use position.

6. A tray-forming templet as set forth in claim 5 wherein the portion of the suspension section inwardly of the inner of the parallel scores has a series of closely-spaced scores parallel with the main scores to accommodate that portion of the suspension section to a curved contour of the vehicle-door.

7. A tray-forming templet as set forth in claim 5 wherein a slot is formed in the suspension section medially of the inner of the pair of parallel scores and the outer strip has a medial tongue extension in length parallel with the scores substantially the same as the length of the slot and a depth transverse to the scoring greater than the depth of end parts of the outer strip which are spaced from the tongue by interposed recesses, the tongue extension being insertable into the slot and exposed part thereof bent over to hold the tongue extension superimposed in contact with the under face of the outer strip and thereby dispose the spaced end parts of the outer strip angled inwardly from the under face of the strip to cause the engagement of the end parts with an interior ledge on the vehicle door.

8. A tray-forming templet as set forth in claim 3 wherein the central cut-out of the pocket-forming section is generally circular with a plurality of inwardly-extending tabs scored to permit depression thereof into the cut-out to yieldingly engage an article seated therein and the side cut-outs are rectangular in contour.

9. A tray-forming templet as set forth in claim 3 wherein the wings are sector-shaped and respectively scored to form the hinged connection thereof to the other portion of the pocket-forming section adjacently inward of and parallel with the respective lateral perimeters of the piece of material.

10. A tray-forming templet as set forth in claim 9 wherein each wing and the respectively opposed perimeters of the pocket-forming section have interfitting formations for yieldingly retaining the wings in their transverse disposition to both portions of the pocket-forming section.

11. A tray-forming templet comprising, a piece of flexible material having a plurality of spaced, parallel, main scores therein dividing the material into a base section and a pocket-forming section separated by an intermediate section and respectively bordered by a back section and a suspension section, the pocket-forming section being divided into two portions by a substantially-median score parallel with the main scores, the one portion of the pocket-forming section having a central cut-out with inwardly-extending tabs scored for transverse bending to the one portion, the one portion of the pocket-forming section also having rectangular-shaped cut-outs at the opposite sides of the central cut-out, parts of the one portion of the pocket-forming section between the central cut-out and the rectangular-shaped cut-outs being scored and slitted to define flaps for bending transverse to the one portion, the other portion of the pocket-forming section being slitted and scored to define wings respectively opposed to the rectangular cut-outs in the one portion of the pocket-forming section, parts of the wings extending beyond the median score being slit in alignment with the corresponding perimeters of the rectangular cut-outs, the piece of material being foldable along the main and median scores to dispose the one portion of the pocket-forming section in spaced parallel disposition above the base section and the other portion of the pocket-forming section normal to the base section, with a part of the back section overlapping and fixed to the other portion of the pocket-forming pocket section, whereby the swinging of the wings on their respective scores into positions transverse to both portions of the pocket-forming section with the edges of the wing parts in contact with the base section, and with the flaps at opposite sides of the central cut-out disposed transversely of the one portion of the pocket-forming section with the edges thereof in contact with the base section, will secure the aforesaid disposition of the sections as a tray with three pockets for the reception of selected articles.

12. A tray-forming templet as set forth in claim 11 wherein other flaps formed in the base section are upset from the face thereof to engage the flaps in the pocket-forming section to hold them transversely-disposed to the base section.

13. A tray-forming templet as set forth in claim 11 wherein the suspension section has a pair of spaced supplemental scores disposed inwardly parallel of the free perimeter of the suspension section to form a pair of strips for folding over into superimposed position for interposition into the space between a vehicle-door sill and the glass panel, to locate the tray in use position.

14. A tray-forming templet as set forth in claim 13 wherein the portion of the suspension section inwardly of the parallel scores has a series of closely-spaced scores parallel with the main scores to accommodate the suspension to a curved contour of the vehicle-door sill.

15. A tray-forming templet as set forth in claim 11 wherein notched ledges are formed on the perimeters of the one portion of the pocket-forming section defining the edges of the rectangular cut-out extending into the respective cut-outs and slots extending into the slit edges of the wings in alignment with the medial score pass over the ledges to seat the wings in the respective ledge notches to retain the wings in their transverse disposition to the portions of the pocket-forming section.

16. A tray-forming templet as set forth in claim 15 wherein other flaps are formed in the base section for upset from the face thereof to engage the flaps in the pocket-forming section and to hold them transversely-disposed to the base section.

17. A tray-forming templet as set forth in claim 3 wherein a slot is formed in the base section medially of the ends and contiguous to the junction of the base section with the front section, and slits are cut in the contiguous portions of the suspension section and the pocket-forming section to provide a tongue insertable into the base-section slot when the material is fixed in its folded tray form, but with the wings and flaps retracted, to hold the tray in collapsed condition for storage.

18. A tray-forming templet as set forth in claim 11 wherein a slot is formed in the base section medially of the ends and contiguous to the junction of the base section with the front section, and slits are cut in the contiguous portion of the suspension section and the pocket-forming section to provide a tongue insertable into the base-section slot when the material is fixed in its folded tray form, but with the wings and the flaps retracted, to hold the tray in collapsed condition for storage.

References Cited in the file of this patent
UNITED STATES PATENTS

| | | |
|---|---|---|
| 2,640,589 | Foster | June 2, 1953 |
| 2,770,411 | MacKay | Nov. 13, 1956 |
| 2,775,390 | Vines | Dec. 25, 1956 |
| 2,927,687 | Sanford | Mar. 8, 1960 |
| 2,983,368 | Lugt | May 9, 1961 |
| 3,005,584 | Coe | Oct. 24, 1961 |
| 3,009,565 | Leone | Nov. 21, 1961 |